US 9,992,761 B2

(12) United States Patent
Shvodian

(10) Patent No.: US 9,992,761 B2
(45) Date of Patent: Jun. 5, 2018

(54) SYSTEMS AND METHODS FOR TRANSMITTING INFORMATION USED TO ESTIMATE A POSITION OF A MOBILE DEVICE

(71) Applicant: NextNav, LLC, Sunnyvale, CA (US)

(72) Inventor: William M. Shvodian, McLean, VA (US)

(73) Assignee: NextNav, LLC, Sunnyvale, CA (US)

( * ) Notice: Subject to any disclaimer, the term of this patent is extended or adjusted under 35 U.S.C. 154(b) by 0 days. days.

(21) Appl. No.: 15/451,251

(22) Filed: Mar. 6, 2017

(65) Prior Publication Data
US 2017/0188327 A1    Jun. 29, 2017

Related U.S. Application Data

(60) Provisional application No. 62/395,759, filed on Sep. 16, 2016.

(51) Int. Cl.
H04W 24/00     (2009.01)
H04W 64/00     (2009.01)
H04W 4/04      (2009.01)
H04W 4/22      (2009.01)

(52) U.S. Cl.
CPC .......... *H04W 64/00* (2013.01); *H04W 4/043* (2013.01); *H04W 4/22* (2013.01); *H04W 4/90* (2018.02)

(58) Field of Classification Search
CPC ........ H04W 64/00; H04W 4/043; H04W 4/22
USPC ......................... 455/456.2, 456.1, 404.2, 457
See application file for complete search history.

(56) References Cited

U.S. PATENT DOCUMENTS

| 8,787,944 | B2 * | 7/2014 | Smith | H04W 64/00 455/404.2 |
| 9,148,771 | B2 * | 9/2015 | Zentner | H04M 3/5116 |
| 9,232,354 | B2 * | 1/2016 | Smith | H04W 64/00 |
| 9,244,848 | B2 * | 1/2016 | Boyd | G06F 12/0868 |
| 9,332,386 | B2 * | 5/2016 | Smith | H04W 64/00 |
| 9,462,448 | B2 * | 10/2016 | Edge | H04W 4/22 |
| 9,541,404 | B2 * | 1/2017 | Yang | G01C 21/32 |
| 9,602,962 | B2 * | 3/2017 | Edge | H04W 4/021 |
| 9,743,238 | B2 * | 8/2017 | Venkatraman | H04W 4/028 |
| 2005/0037775 | A1 * | 2/2005 | Moeglein | G01S 5/0036 455/456.1 |

(Continued)

OTHER PUBLICATIONS

Linsner, Marc, Cisco Systems, Inc., IOT Vertical Solutions Group, "Indoor Location Accuracy using Enterprise Wi-Fi™ in Real-Time", APCO International, Public Safety Broadband Summit, Renaissance Hotel, Washington, DC, 17 pages, May 16-17, 2016.

(Continued)

*Primary Examiner* — Marceau Milord

(57) ABSTRACT

Transmitting information used to estimate a position of a mobile device. This disclosure describes NEAD-based and external location server (ELS)-based positioning systems and methods that determine when an identifier of a mobile device is not known or when the identifier of the mobile device is known but cannot be detected during a search by reference points, and to then provide a location of a reference point that had previous contact with the mobile device instead of an estimated position of the mobile device. The provided location of the reference point can be used by a location server to generate an estimate of mobile device position.

39 Claims, 9 Drawing Sheets

(56) References Cited

U.S. PATENT DOCUMENTS

| | | | | |
|---|---|---|---|---|
| 2005/0090266 A1* | 4/2005 | Sheynblat | ................ | G01S 5/02 455/456.1 |
| 2011/0039578 A1* | 2/2011 | Rowitch | ................ | G01S 5/10 455/456.1 |
| 2014/0162693 A1* | 6/2014 | Wachter | ................ | H04W 4/04 455/456.3 |
| 2014/0195102 A1* | 7/2014 | Nathanson | ............ | G07C 5/0808 701/31.4 |
| 2014/0274135 A1* | 9/2014 | Edge | ................ | H04W 4/021 455/456.2 |
| 2014/0274136 A1* | 9/2014 | Edge | ................ | H04W 4/04 455/456.2 |
| 2015/0201305 A1* | 7/2015 | Edge | ................ | H04W 4/021 455/456.3 |
| 2015/0223191 A1* | 8/2015 | Lopes | ................ | H04W 64/00 455/456.1 |
| 2015/0241229 A1* | 8/2015 | Moeglein | ............ | G01S 5/0236 455/456.2 |
| 2015/0296359 A1* | 10/2015 | Edge | ................ | H04W 4/22 455/404.2 |
| 2016/0330769 A1* | 11/2016 | Edge | ................ | H04W 24/10 |
| 2017/0164315 A1* | 6/2017 | Smith | ................ | H04W 64/00 |
| 2017/0234978 A1* | 8/2017 | Shvodian | ............ | G01S 11/06 455/522 |

OTHER PUBLICATIONS

Bergmann, Vice President, Regulatory Affairs, CTIA—The Wireless Association©, Wireless E9-1-1 Location Accuracy Requirements, PS Docket No. 07-114, 20 pages, Nov. 18, 2014.

Alliance for Telecommunications Industry Solutions (ATIS), "Location Accuracy Improvement for Emergency Calls", ATIS-0700028, ATIS Standard, including "Np Schema Documentation", 104 pages, Approved May 2, 2016.

Alliance for Telecommunications Industry Solutions (ATIS), "Location Accuracy Improvement for Emergency Calls", ATIS-0700028 v2 (Draft), ATIS Standard, 100 pages, Last Revision (version 0.3) Feb. 9, 2017.

* cited by examiner

SYSTEMS AND METHODS FOR TRANSMITTING INFORMATION USED TO ESTIMATE A POSITION OF A MOBILE DEVICE

RELATED APPLICATIONS

This application relates to the following related application(s): U.S. Pat. Appl. No. 62/395,759, filed 16 Sep. 2016, entitled SYSTEMS AND METHODS FOR MOBILE DEVICE POSITIONING. The content of each of the related application(s) is hereby incorporated by reference herein in its entirety.

BACKGROUND

Determining the exact location of a mobile device (e.g., a mobile phone) in an environment can be quite challenging, especially when the mobile device is located in an urban environment among buildings, or is located within a particular building. Imprecise estimates of the mobile device's position can delay emergency personnel response times by sending emergency response personnel to the wrong area of a floor in a building, or even to the wrong floor of a building.

Since mobile devices operated by users are often mobile and the locations of the mobile devices vary over time, enhancements have been made to emergency response services to support users who dial emergency response numbers. In the United States ("US"), "Enhanced 911" (also referred to as "E911" or "e911") services provide an estimate of a mobile device's position at a particular time. In some implementations of E911, one or more reference points (e.g., Wi-Fi access points, Bluetooth beacons, or other types of local area network transmitters) can be used to estimate the position of a mobile device that is within range of those reference point(s). "Reference points" may also be referred to in general as "beacons". The estimated position can be a geodetic location, or a civic address which may optionally contain additional information such as apartment number, suite number, office/cubicle number and floor number. When a 911 call is placed from the mobile device, an estimate of the mobile device's position can be determined using trilateration or other known processes that compute an estimated position of a mobile device using locations of reference points in communication with the mobile device and measurements that estimate approximate distances between the mobile device and the reference point(s). The estimate of the mobile device's position can be returned to the Public Safety Access Point ("PSAP") handling the 911 call with the mobile device.

In one approach for enhancing emergency response services to support mobile devices, the mobile device may scan for identifiers of reference points, such as Media Access Control ("MAC") addresses (also known as the Basic Services Set Identifier for Wi-Fi access points) or Bluetooth Public Device Addresses ("BT-PDA") for a Bluetooth reference point. Any identifiers of reference points that are detected by the mobile device may be used to look up locations of those reference points that are stored in a National Emergency Address Database ("NEAD"). The stored locations of the reference points, in addition to measurements made by the mobile device that estimate approximate distances between the mobile device and the reference points, may be used to estimate the position of the mobile device (e.g., using trilateration). The estimate of the mobile device's position can be returned to the PSAP handling the 911 call with the mobile device. Unfortunately, this approach cannot be used when locations of detected reference points are not stored in the NEAD.

An alternative to storing all reference point locations in the NEAD uses an external location server (ELS) for emergency response services supporting mobile devices. Instead of storing all reference point locations in the NEAD, the NEAD can store URLs or other source indicators that are indexed and identified using the identifiers of reference points detected by the mobile device. Such URLs or other source indicators may be used to identify particular entities (e.g., buildings, campuses, zones in an environment controlled by an enterprise or other entity). The NEAD can query a particular ELS using the URL or other source indicator, and provide that ELS with the detected identifiers of the reference points as well as an identifier of the mobile device (e.g., a MAC identifier of the mobile device). The ELS then sends a query to an External Location Controller (ELC) of an external entity based on the reference point identifier. The ELC can instruct the reference point and other reference points it controls to search for the identifier of the mobile device, and then compute an estimate of the mobile device's position using the locations of the reference points, in addition to measurements made by the reference points that estimate approximate distances between the mobile device and the reference points (e.g., using trilateration). The estimate of the mobile device's position (e.g., Geodetic location, civic location, or other) may then be returned to the PSAP through the NEAD.

Unfortunately, the above ELS-based approach cannot be used when the identifier of the mobile device is not available, or when the mobile device's identifier cannot be detected during the search by the reference points. Thus, solutions are needed to make locations of reference points available for computing an estimate of a mobile device's position when the NEAD does not store the locations of reference points and when the mobile device's identifier is either not available or cannot be detected by reference points.

DETAILED DESCRIPTION

Emergency response services that rely on the National Emergency Address Database (NEAD) or an external location server (ELS) to assist with estimating a position of a mobile device are not adequate under certain circumstances, including circumstances when (a) locations of an entity's reference points are stored outside of the NEAD (e.g., at the entity), and (b) when either (i) an identifier of the mobile device (e.g., a MAC address) is not available for transmission to the ELS, or (ii) the entity's reference points cannot detect the identifier of the mobile device during a search. Solutions to these technical problems are provided below.

Figure 1:
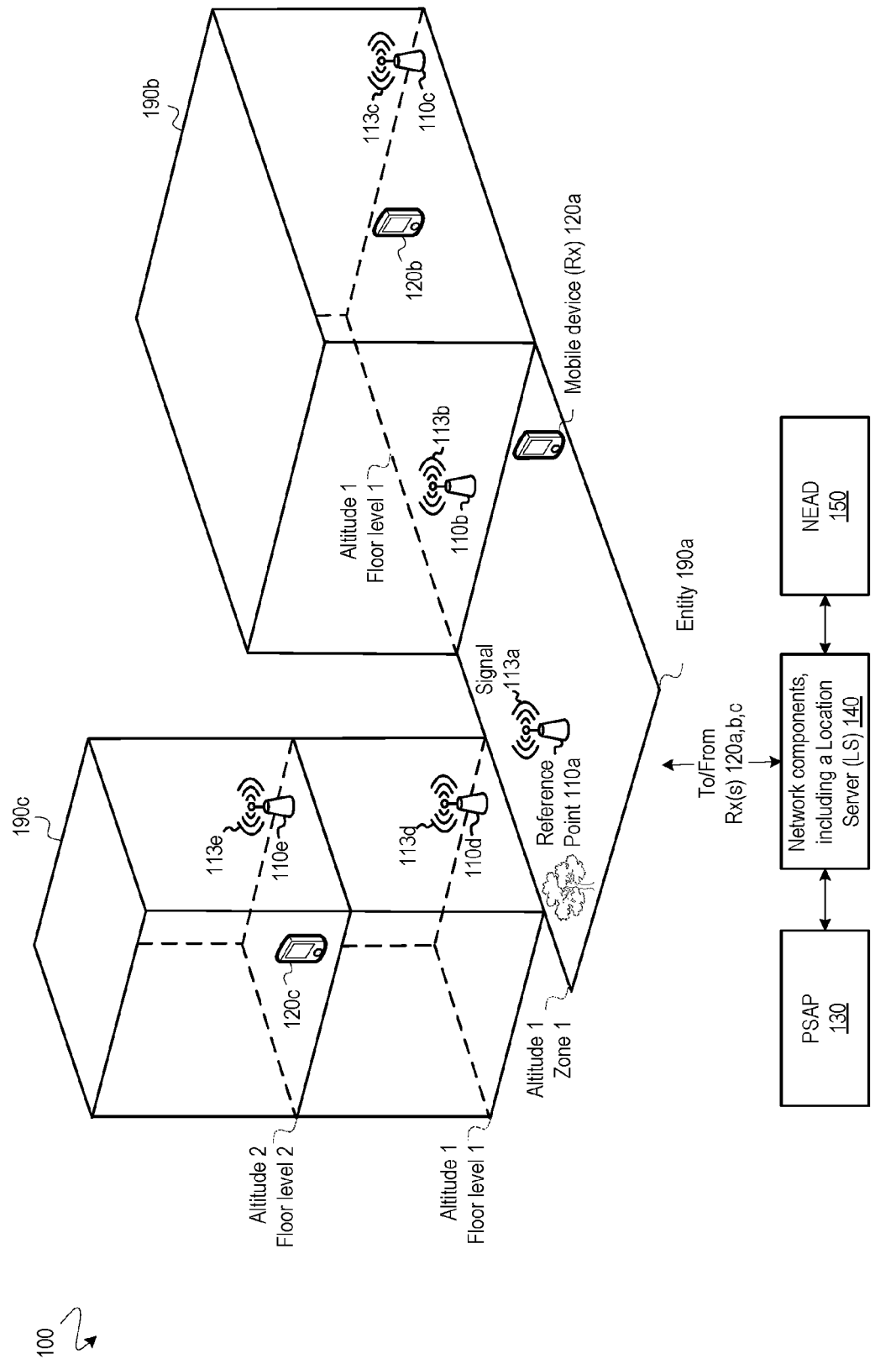
FIG. 1 depicts an operational environment for estimating positions of mobile devices using locations of reference points that are stored at a NEAD.

Attention is initially drawn to FIG. 1, which depicts an operational environment 100 for estimating positions of mobile devices using locations of reference points that are stored at a NEAD. The operational environment 100 includes reference points 110a-e and mobile devices 120a-c, which are located at different altitudes or floor levels of different entities 190a-c. The entities 190a-c may correspond to buildings, zones, or other such features in the operational environment 100 where the mobile devices 120a-c can be located at particular instances of time.

Reference to label "110" may refer generally to a single reference point 110 or generally to multiple reference points 110, and may refer to any of the reference points 110a-e. The reference points 110 may take any of different forms, including Wi-Fi access points, Bluetooth beacons, radio frequency ("RF") transmitters, and other reference points known in the art.

Reference to label "120" may refer generally to a single mobile device 120 or generally to multiple mobile devices 120, and may refer to any of the mobile devices 120a-c. As shown in the figures, references to a mobile device 120 may use the abbreviation of "Rx". The mobile devices 120 may take any of multiple forms, including a mobile computing device such as a mobile phone, a tablet, a laptop, a transceiver, a receiver, or other computing devices.

The mobile devices 120 and the reference points 110 are shown in FIG. 1 (and later in FIG. 3 and FIG. 7) to reside at different altitudes, floor levels, or zones of the different entities 190a-c. The vertical positions for the mobile devices 120 and the reference points 110 relative to particular surfaces are shown for illustration only. The vertical position for each of the mobile devices 120 above the particular surface can vary—e.g., typically, the mobile devices 120 are at approximately one meter above the floor when carried by a user or when placed on a table or desk. The vertical position for each of the reference points 110 above its corresponding floor level can also vary depending on where the reference points 110 are installed.

As shown in FIG. 1, signaling 113a-e is communicated between respective reference points 110a-e and any of the mobile devices 120a-c that are within a transmission range of the respective reference points 110a-e. The signaling 113a-e may be wireless signaling that is suitable for the type of the reference point 110 in use (e.g. Wi-Fi, Bluetooth, RF, or other). As is known in the art, the signaling 113 from a particular reference point 110 may be used to determine a received signal strength indicator ("RSSI"), and/or a round trip time ("RTT"), which can be used to compute an estimate of a distance between that reference point 110 and a particular mobile device 120 that received the signaling, as is known in the art. Computed estimates of distances between the particular mobile device 120 and three or more of the reference points 110 can be used along with known positions of those reference points 110 to estimate a position of the mobile device 120 using trilateration or other known techniques.

As shown in FIG. 1, a Public Safety Access Point ("PSAP") 130 may communicate with a network after an emergency call is initiated by a mobile device 120 to the network. After initiation of the emergency call, location server ("LS") 140 (e.g., an E-SMLC or other server known in the art) determines an estimate of a position for that mobile device 120, where the estimate of the position is computed by the LS 140 using estimates of distances between that mobile device 120 and one or more of the reference points 110, as well as known positions of those reference points 110 that can be retrieved from a NEAD 150. Further details about this process are provided below with reference to FIG. 2.

Figure 2:
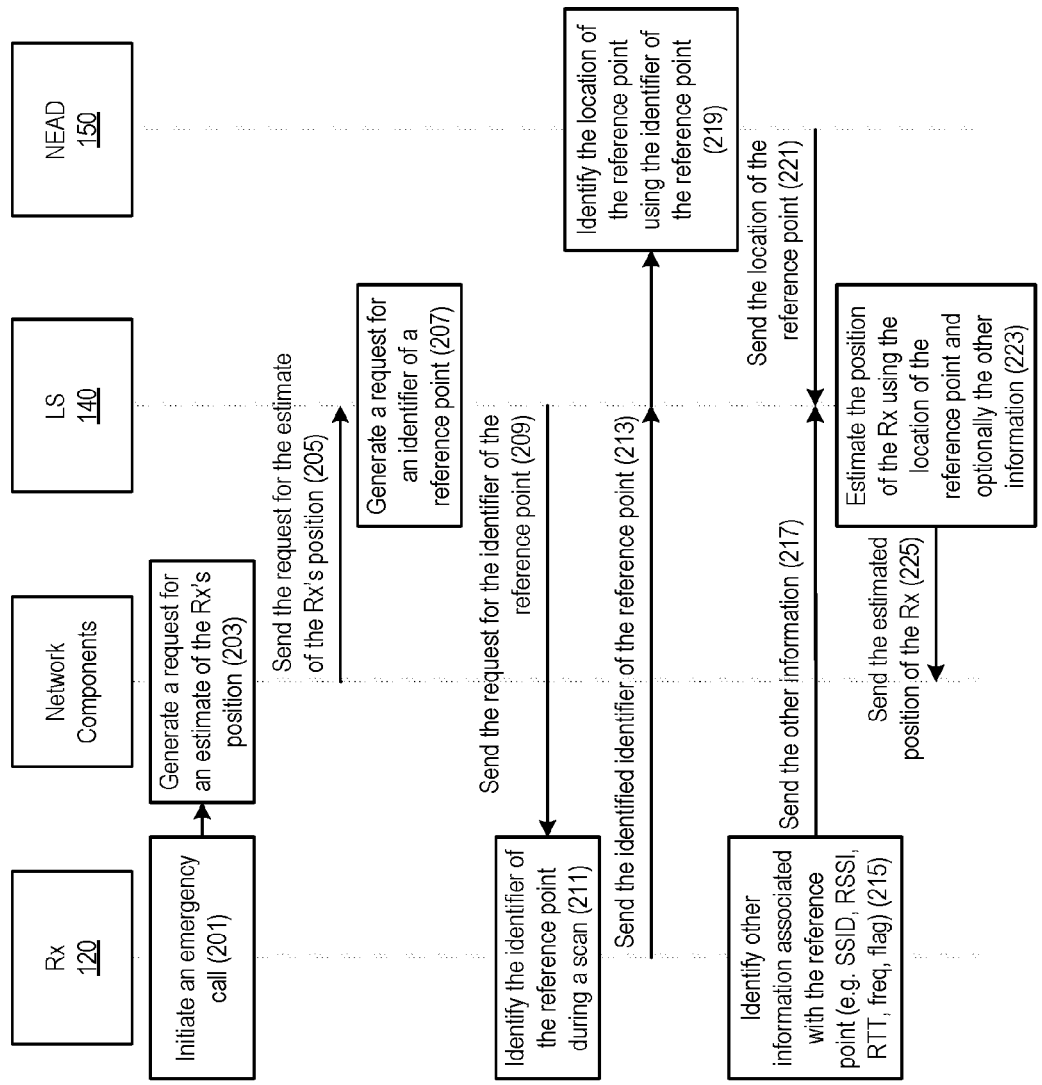
FIG. 2 provides a process for transmitting information used to estimate a position of a mobile device using locations of reference points that are stored at a NEAD.

A process for transmitting information used to estimate a position of a mobile device using locations of reference points that are stored at a NEAD is provided in FIG. 2. As shown, a mobile device (e.g., one of the mobile devices 120a-c) is connected to one or more network components after initiating an emergency call (step 201). Such network components are known in the art and may include: a network transmitter (e.g., eNB) in range of the mobile device 120, a Mobility Management Entity (MME), a radio network controller (RNC), or other control nodes for a network connected to the mobile device 120.

In one embodiment, the call is forwarded to the PSAP, which generates a request for an estimate of the mobile device's position (step 203), and send the request for the estimate of the mobile device's position to a location server ("LS") (e.g., the LS 140) (step 205). In other embodiments, network components generate the request for the estimate of the mobile device's position (step 203). The LS generates a request for an identifier of a reference point that is within range of the mobile device (e.g., one of the reference points 110a-e) (step 207), and sends the request to the mobile device (step 209). The mobile device detects an identifier of a reference point during a scan (step 211), and sends the identified identifier of the reference point to the LS, which sends the identified identifier of the reference point to a NEAD (e.g., the NEAD 150) as part of a request to retrieve a location of the reference point that has been previously stored in the NEAD (step 213). The NEAD identifies (e.g., looks up) the location (e.g., civic location and geocoded location) of the reference point using the identifier of the reference point received from the LS (step 219), and sends the location of the reference point to the LS (step 221). Transmission of data between the NEAD and the LS may be carried out by known means, including the NEAD query ("Nq") interface. A single correlation between the reference point and its location may be stored in the NEAD. As is known, a National Emergency Address Manager (NEAM) may be used to store location information for reference points in the NEAD.

The mobile device may also identify other information associated with the reference point from signaling exchanged between the mobile device and the reference point (e.g., the signaling 113) (step 215), and may also send the other information associated with the reference point to the LS (step 217). The other information may include, for example, an identifier (e.g., an SSID), a received signal strength indicator ("RSSI"), a round trip time ("RTT"), a channel frequency band useful for determining different propagation characteristics of the signaling, and a serving flag that lets the LS know that the mobile device is connected to a particular network, each of which corresponds to the signaling and/or the reference point, as is known in the art.

The LS estimates the position of the mobile device using the location of the reference point and optionally the other information (step 223), and then sends the estimated position of the mobile device to the network components for distribution to a PSAP using methods for doing so that are known in the art (step 225). The LS may estimate the position of the mobile device as is known in the art. In one embodiment, the LS may estimate the position of the mobile device by (a) repeating steps 211-221 for other reference points, (b) estimating distances between the mobile device and the reference point/other reference points, and (c) performing trilateration using the estimated distances and the locations of the reference point/other reference points retrieved from the NEAD.

Typically, the NEAD returns both a dispatchable address and a location for a reference point. A dispatchable address in a large building to which emergency personnel can be dispatched may include the building floor on which the mobile device resides, and an area of that floor or a particular room on that floor. If the LS requests the locations of n reference points associated with identifiers detected by the mobile device, and receives identifiers and coordinates for all n reference points, the LS can then use the n RSSI and/or RTT measurements corresponding to signaling from each of the n reference points to decide the final dispatchable address to send to the network components, which send that final dispatchable address to the PSAP. In one embodiment, the LS compares different RSSI and/or RTT corresponding to different signaling received from different reference points by the mobile device to determine which of the different reference points is closest to the mobile device. A particular reference point that transmitted signaling corresponding to the highest RSSI and/or shortest RTT could be determined to be closest to the mobile device, and the location or the dispatchable address of that reference point may be used as the estimated position of the mobile device, or may be used to identify a floor of a building, an area of that floor, or a room of that floor at which the mobile device is assumed to reside. Other uses of RSSI known in the art are also contemplated.

Figure 3:
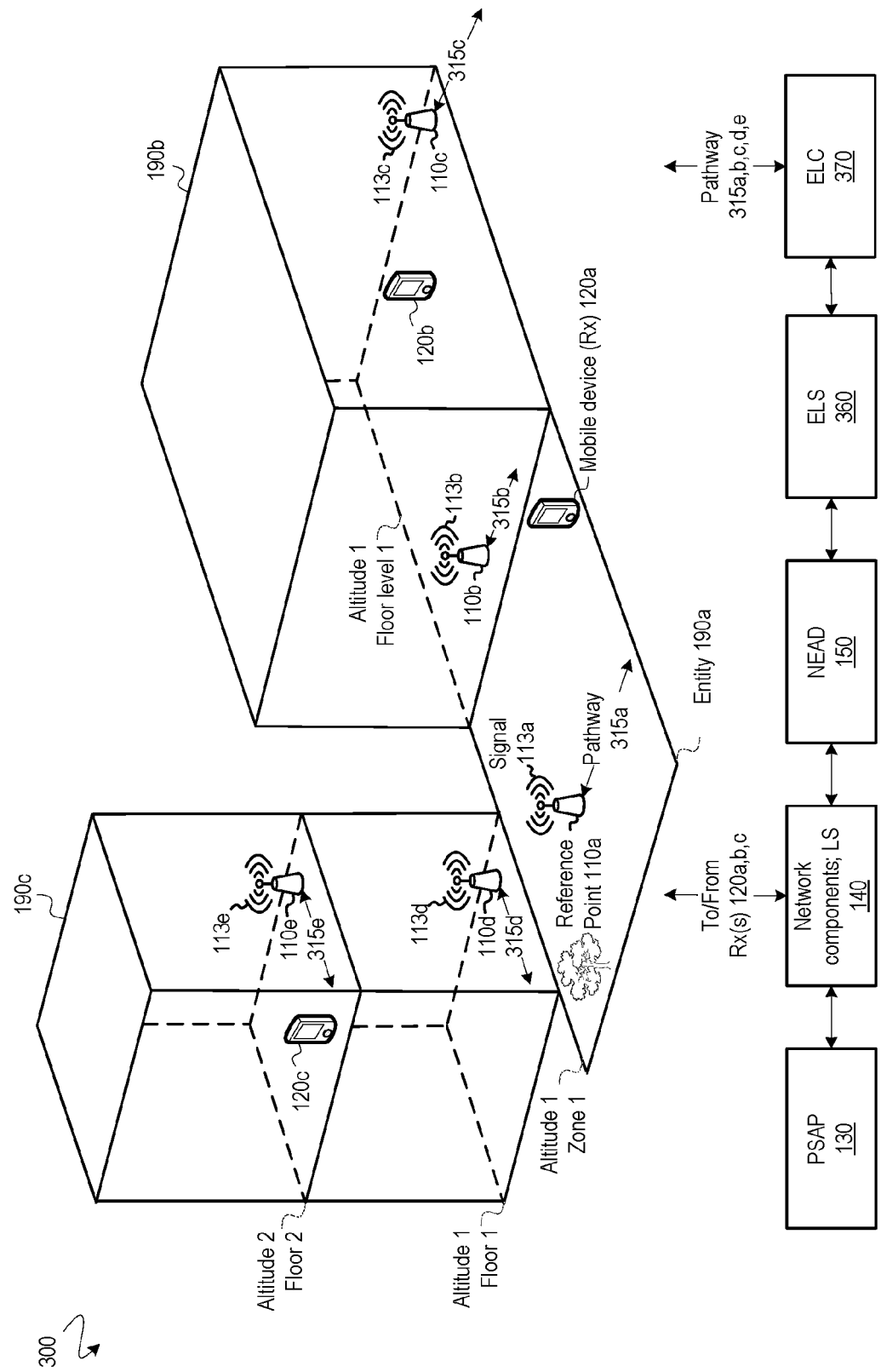
FIG. 3 depicts an operational environment for estimating positions of mobile devices using locations of reference points that are stored outside of the NEAD.

Attention is now drawn to FIG. 3, which depicts an operational environment 300 for estimating positions of mobile devices using locations of reference points that are stored outside of the NEAD (e.g., at an entity, which could be an enterprise, apartment, condo, or other, and not in the NEAD). The operational environment 300 includes overlapping features that were previously presented in FIG. 1, and also includes one or more external location servers ("ELS") 360, one or more external location controllers ("ELC") 370, and communication pathways 315*a-c* between the one or more ELCs 370 and respective reference points 110*a-e* that are located at respective entities 190*a-c*. The communication pathways 315*a-c* may be any known wired or wireless pathways. Each of the entities 190*a-c* may share the same ELS 360 and ELC 370, or different entities 190*a-c* may use a different ELS 360 and/or a different ELC 370, as is known in the art.

An ELC is an entity that manages and controls reference points. The ELC may be a commercial enterprise that manages reference points, and includes a data source that stores locations of reference points in association with identifiers of those reference points.

An ELS may be operated by an external location service. An ELS allows the NEAD to retrieve location information of a reference point from an external source (e.g., the ELC that manages that reference point). For example, the ELS identifies the association of a reference point identifier with an ELC that manages the reference point, and communicates with the ELC to retrieve the location of the reference point, among other functions shown in FIG. 4, FIG. 5 and FIG. 6.

Figure 4:
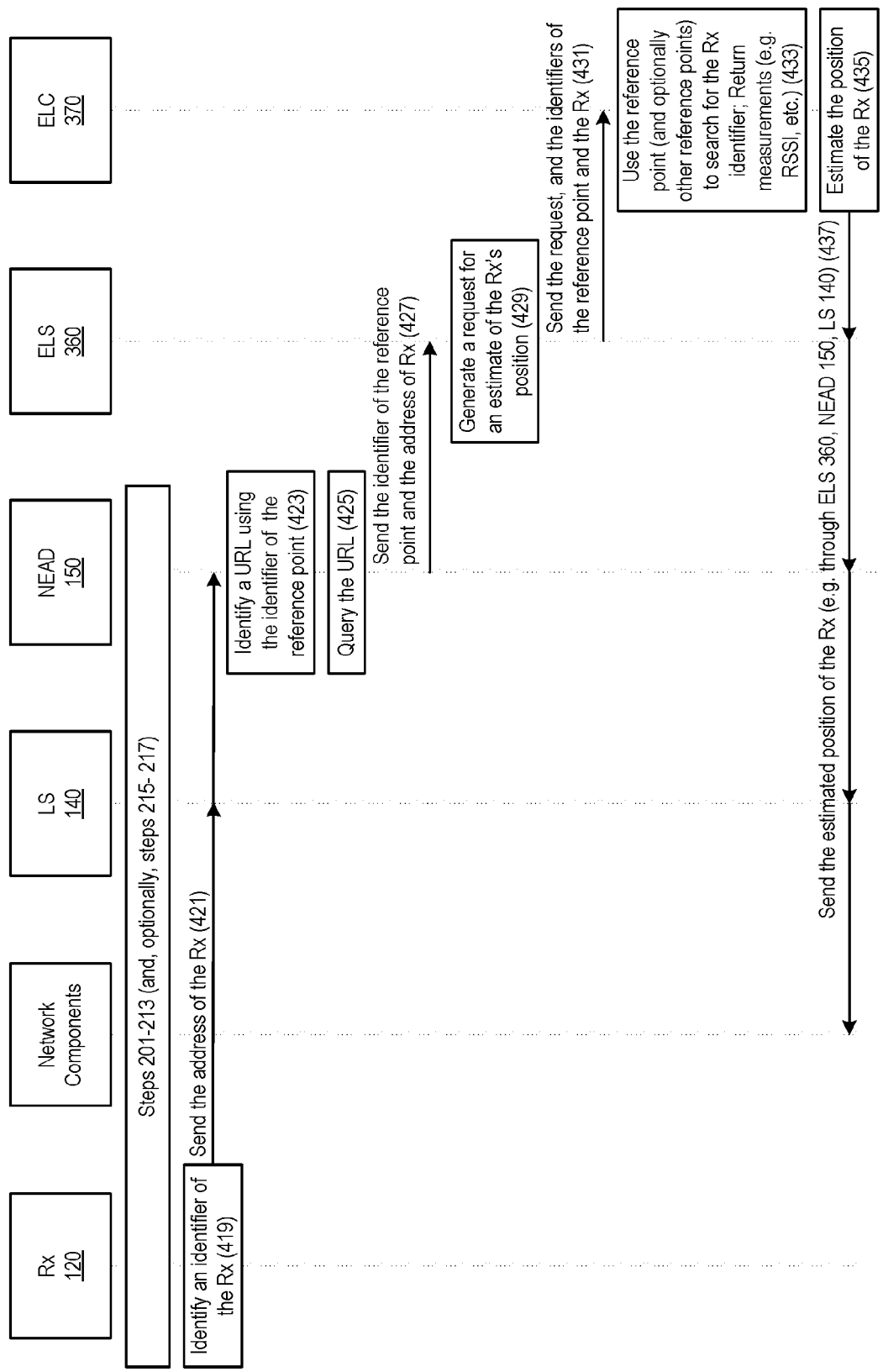
FIG. 4 provides a process for transmitting information used to estimate a position of a mobile device using locations of reference points that are stored outside of the NEAD.

A process for transmitting information used to estimate a position of a mobile device using locations of reference points that are stored outside of the NEAD is provided in FIG. 4. Steps 201-213 and optionally steps 215-217 from FIG. 2 may be repeated for FIG. 4. As shown, a mobile device identifies its identifier (e.g., a MAC address) (step 419), and sends the identifier to the LS, which sends the identifier to the NEAD (step 421). If the mobile device's identifier were not known from steps 419 and 421, the NEAD would return an error message to the LS (step not shown). Transmission of the identifier may use any type of viable signaling, including information elements for carrying the identifier.

The NEAD uses the identifier of the reference point from step 213 to search for a locally stored location of the reference point but instead finds a URL (or other source identifier, such as a Fully Qualified Domain Name (FQDN), IP address, SIP address, or other source identifier) that that has been previously stored at the NEAD in place of a location of the reference point (step 423).

The NEAD queries the URL (or other source identifier) (step 425), which directs the NEAD to an ELS (e.g., the ELS 360), and the NEAD sends the identifier of the reference point and the identifier of the mobile device to the ELS (step 427). Transmission of data between the NEAD and the ELS may be carried out by known means.

The ELS generates a request for an estimate of the mobile device's position (step 429), and sends the request, along with the identifier of the reference point and the identifier of the mobile device, to an ELC (e.g., ELC 370) (step 431).

The ELC instructs the reference point, and optionally other reference points, to search for the mobile device identifier, and to perform measurements corresponding to the mobile device (step 433). Examples of measurements include RSSI, RTT, or other measurements that can be determined from signaling exchanged between the mobile device and the reference points, and later used to estimate distances between the mobile device and the reference points, as is known.

The ELC identifies and uses the location of the reference point and optionally other locations of other reference points that searched for and communicated with the mobile device, along with estimated distances between the mobile device and those reference points, to estimate the position of the mobile device (step 435), as known in the art. If the mobile device was not found by any of the reference points, the ELC would return an error message to the ELS (step not shown). By way of example, a server or other processing machine can be used to estimate the position of the mobile device as is known in the art.

The ELC then sends the estimated position of the mobile device to the ELS, which sends the estimated position of the mobile device to the NEAD, which sends the estimated position of the mobile device to the LS, which sends the estimated position of the mobile device to other network components for distribution to a PSAP using methods for doing so that are known in the art (step 437).

As discussed below, there are two problems with the approach illustrated by FIG. 4.

First, release 13 of LPP and version 2.0.3 of LPPe do not provide capability for the mobile device to send its identifier (e.g., Wi-Fi MAC address) to the LS during step 421. Future versions of LPP and LPPe may support the transmission of the mobile device identifier, but mobile devices with version 13 of LPP or 2.0.3 of LPPe will not be able to be located in an entity's network. A process for overcoming this problem is discussed below with reference to FIG. 5.

Second, if reference point(s) do not find the mobile device's identifier during the search of step 433, the ELC returns an error or "not found" message, and the NEAD and LS will be unable to determine where the mobile device is located. A process for overcoming this problem is discussed below with reference to FIG. 6 after the discussion referencing FIG. 5.

Figure 5:
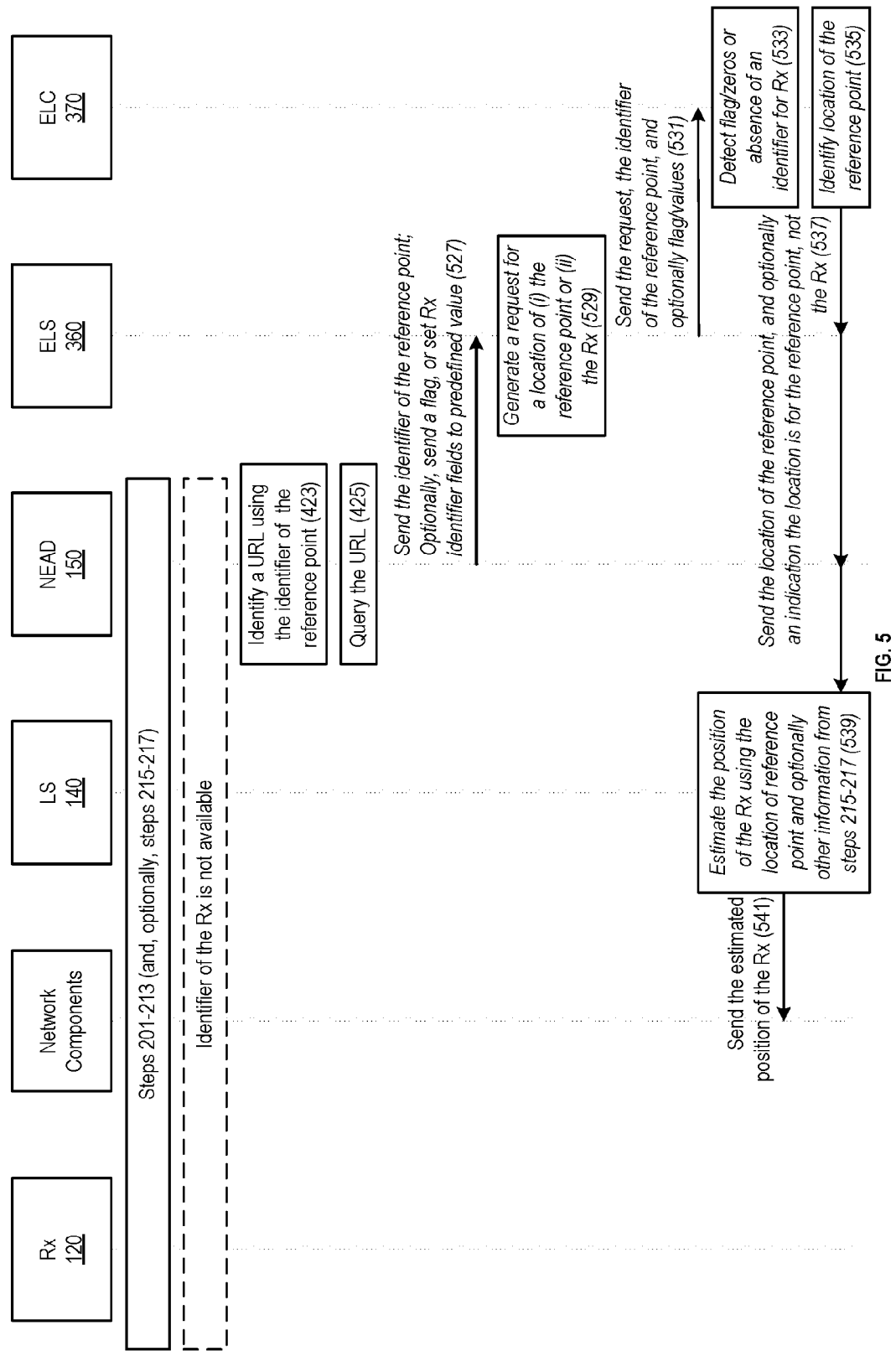
FIG. 5 provides a process for transmitting information used to estimate a position of a mobile device using locations of reference points that are stored outside of the NEAD when an identifier of the mobile device is not available.

A process for transmitting information used to estimate a position of a mobile device using locations of reference points that are stored outside of the NEAD when an identifier of the mobile device is not available is provided in FIG. 5. The identifier of the mobile device may be unavailable for different reasons—e.g., the mobile device is not capable of providing its identifier, the mobile device does not send its identifier to the LS, the transmission protocol between the mobile device and the LS does not support sending the identifier, the transmission protocol between the LS and the NEAD does not support sending the identifier, or another reason.

Steps 201-213 and optionally steps 215-217 from FIG. 2, and steps 423-425 from FIG. 4, may be repeated during the process of FIG. 5. As shown, the NEAD sends the identifier of a reference point to the ELS, and optionally sends an indication for indicating no mobile device identifier is available (step 527). The indication may take different forms in different embodiments. In one embodiment the indication is a flag (e.g., one or more bits). In another embodiment, the indication includes mobile device identifier fields set to predefined values (e.g., zero). In contrast to FIG. 4, the NEAD can be programmed in some embodiments to not send an error message to the LS, or the LS can be programmed in other embodiments to ignore an error message received from the NEAD, even though the mobile device's identifier is not known (step not shown).

The ELS may generate a request for a location of the reference point, or the ELS may generate a request for a location of the mobile device (step 529). The ELS sends the request to the ELC, along with the identifier of the reference point, and optionally the indication from the NEAD or another indication generated by the ELS indicating that no mobile device identifier is available (step 531). The ELC either receives the request for the location of the reference point (step not shown), or the ELC receives the request for the location of the mobile device and detects an indication that no mobile device identifier is available, or detects that the messaging from the ELS does not contain an identifier of the mobile device (step 533).

The ELC uses the identifier of the reference point to identify (e.g., look up) a location of the reference point from a database (step 535). The ELC could identify the location of the reference point in response to receiving a request for the location of the reference point from the ELS, in response to detecting an indication that no mobile device identifier is available, or in response to detecting that the messaging from the ELS does not contain an identifier of the mobile device.

The ELC sends the identified location of the reference point and optionally an indication that the location is for the reference point and not the mobile device to the ELS, which forwards the reference point's location and optionally an indication the location is for the reference point and not the mobile device to the NEAD, which forwards the reference point's location and optionally an indication the location is for the reference point and not the mobile device to the LS (step 537). The indications may be the same indications or different indications, and may take different forms—e.g., a flag, a bit or multiple bits set to a particular value (e.g., 0, 1), the absence of an expected field associated reserved for the estimated position, or another indication.

The LS estimates the position of the mobile device using the location of reference point and optionally other information from steps 215-217 (step 539), and then sends the estimated position of the mobile device to the other network components for distribution to a PSAP using methods for doing so that are known in the art (step 541). The LS may estimate the position of the mobile device as is known in the art. For example, the LS may estimate the position of the mobile device as was described for the LS with reference to FIG. 2.

Figure 6:
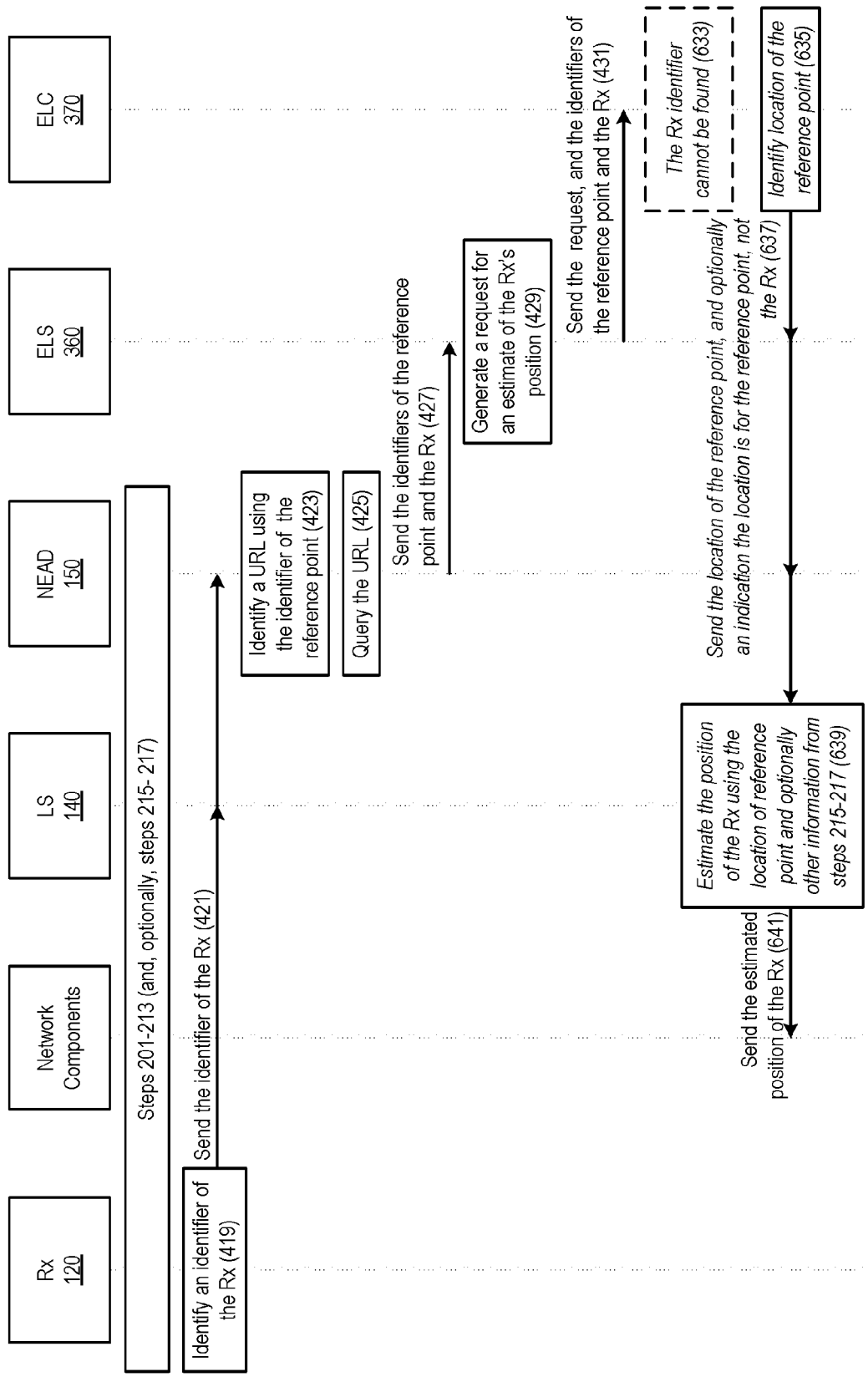
FIG. 6 provides a process for transmitting information used to estimate a position of a mobile device using locations of reference points that are stored outside of the NEAD when an identifier of the mobile device is not detected by the reference points.

A process for transmitting information used to estimate a position of a mobile device using locations of reference points that are stored outside of the NEAD when the mobile device is not detectable by reference point(s) is provided in FIG. 6. The mobile device may be undetectable for different reasons—e.g., the mobile device's power is turned off, the battery of the mobile device does not have enough power to exchange signaling with the reference point(s), the network is tuned to not report the location of a mobile device if it is determined via network tuning that the mobile device is not inside the boundaries of a particular entity, or another reason.

Steps 201-213 and optionally steps 215-217 from FIG. 2, and steps 419-431 from FIG. 4, may be repeated during the process of FIG. 6. As shown, the ELC uses the reference point, and optionally other reference points, to search for the mobile device identifier, but the mobile device cannot be located by the reference point or the other reference points during the search (step 633). Upon determining that the mobile device cannot be located, the ELC uses the identifier of the reference point to identify (e.g., look up) a location of the reference point from a database (step 635). In contrast to FIG. 4, the ELC can be programmed to not send an error message to the ELS in some embodiments, or the ELS can be programmed to ignore the error message in other embodiments, when the reference point(s) are unable to locate the mobile device (step not shown).

The ELC sends the identified location of the reference point and optionally an indication that the location is for the reference point and not the mobile device to the ELS, which forwards the reference point's location and optionally an indication that the location is for the reference point not the mobile device to the NEAD, which forwards the reference point's location and optionally an indication that the location is for the reference point not the mobile device to the LS (step 637). The indications may be the same indications or different indications, and may take different forms—e.g., a flag, a bit or multiple bits set to a particular value (e.g., 0, 1), the absence of an expected field associated reserved for the estimated position, or another indication.

The LS estimates the position of the mobile device using the location of the reference point and optionally other information from steps 215-217 (step 639), and then sends the estimated position of the mobile device to the other network components for distribution to a PSAP using methods for doing so that are known in the art (step 641). The LS may estimate the position of the mobile device as is known in the art. For example, the LS may estimate the position of the mobile device as was described for the LS in FIG. 2.

In certain embodiments of both FIG. 5 and FIG. 6, the NEAD stores the reference point's location received from the ELS so the reference point's location can be retrieved from the NEAD instead of the entity of that reference point, and then used to estimate a position of a mobile device when an identifier of that mobile device is not known.

In other embodiments, the NEAD does not store the reference point's location received from the ELS for such future use. Entities and network providers can mandate the behavior of the NEAD and can ensure it does not store reference point locations from the ELS. When the LS receives the reference point location from the NEAD, the LS may not be aware whether the NEAD stores the location of the reference point or if the NEAD received the location from the ELS. Thus, the same steps to protect the contents of the NEAD should protect the data received from the ELS.

The approaches for transmitting information used to estimate a position of a mobile device illustrated by FIG. 5 and FIG. 6 offer technical improvements over previous approaches, because they expand the circumstances when a mobile device's position can be estimated.

Figure 7:
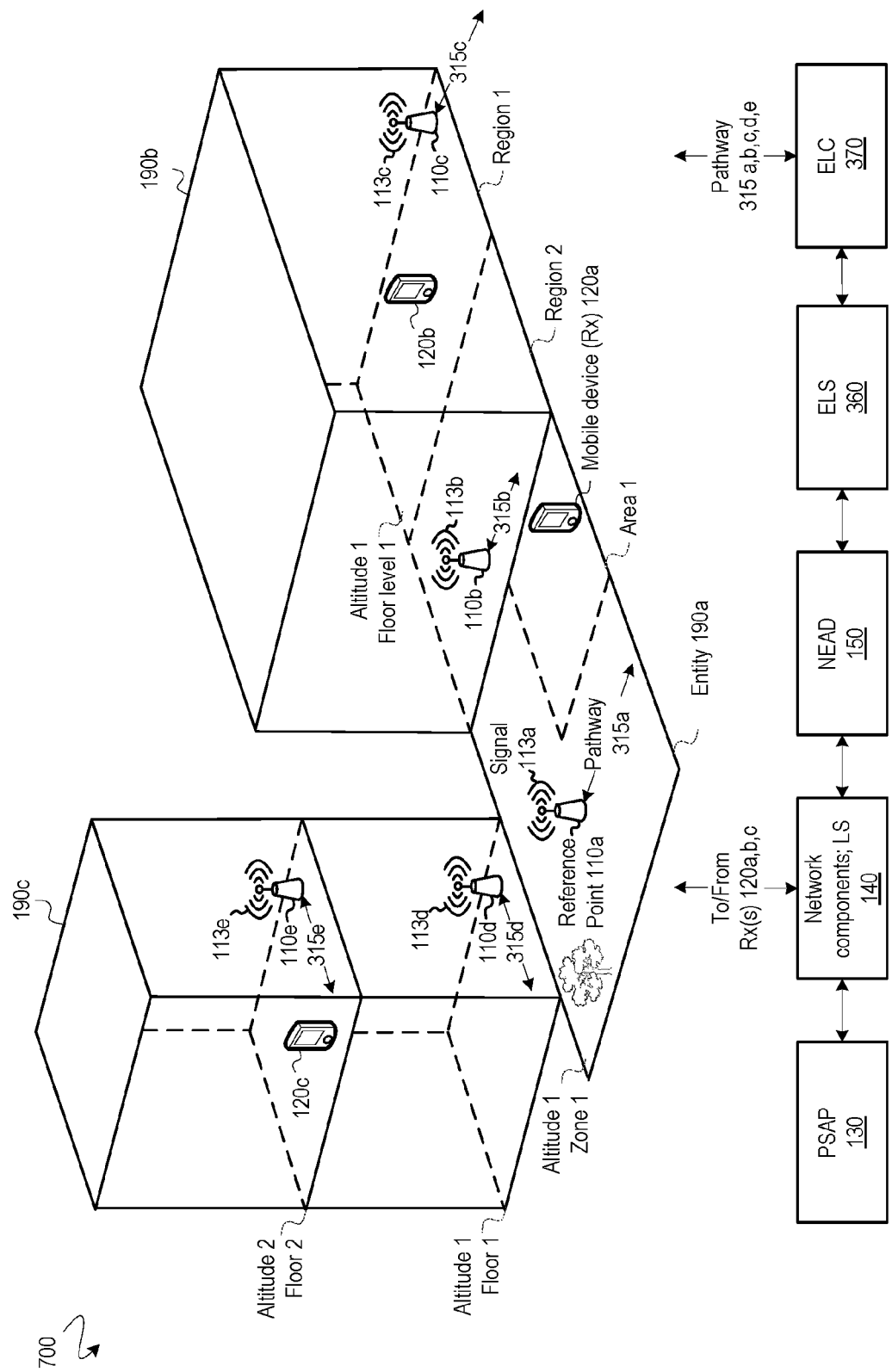
FIG. 7 depicts an operational environment for estimating positions of mobile devices using location(s) of reference point(s) and other feature(s) of the operational environment.

Attention is now drawn to FIG. 7, which depicts an operational environment 700 for estimating positions of mobile devices using location(s) of reference point(s) and other feature(s) of the operational environment 700. The operational environment 700 includes overlapping features that were previously presented in FIG. 1 and FIG. 3, and also includes two regions (i.e., Region 1 and Region 2) of the entity 190*b*, and an area (e.g., Area 1) of zone 1.

Figure 8:
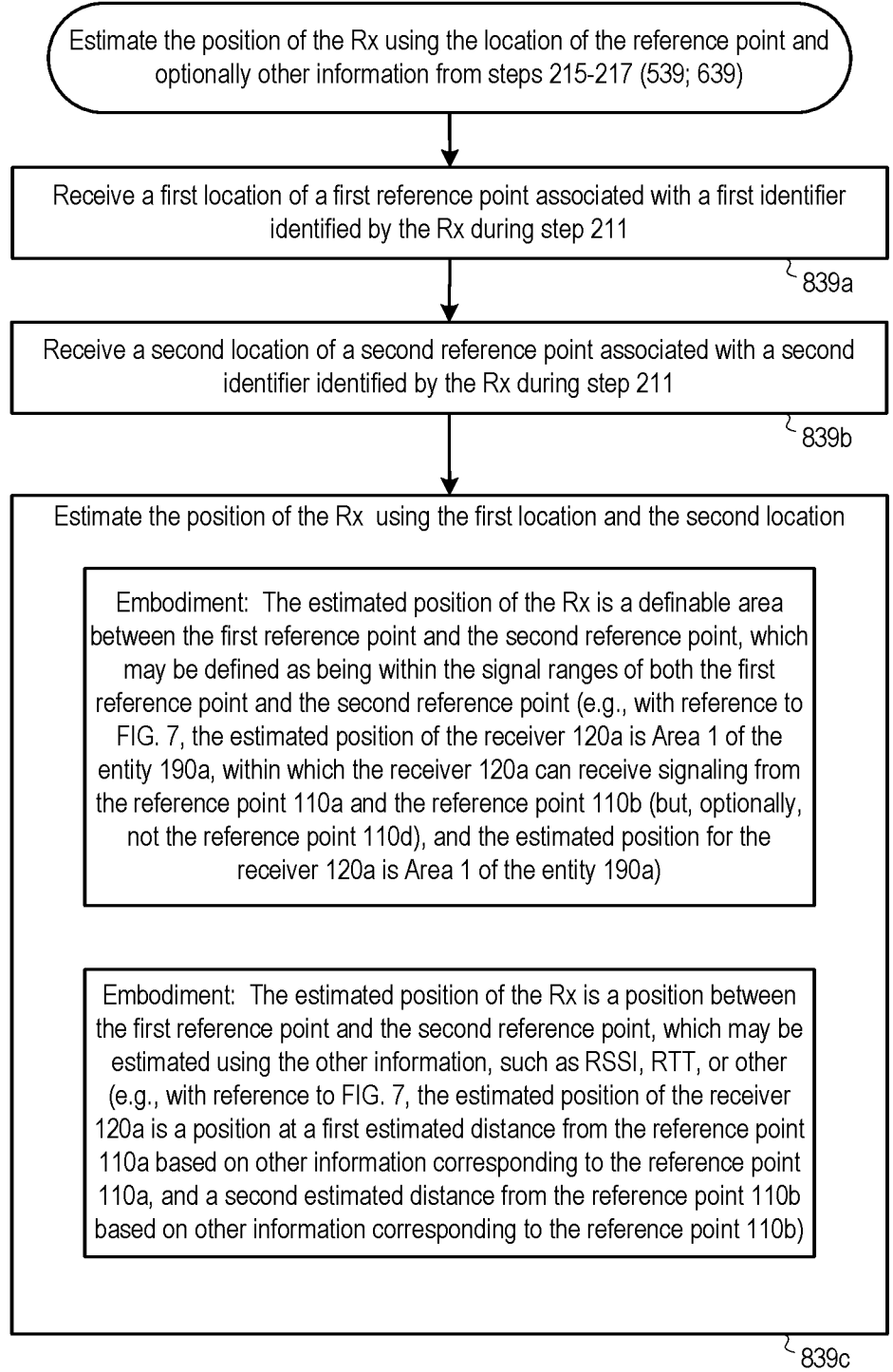
FIG. 8 illustrates approaches for estimating positions of mobile devices using locations of reference points.

Certain approaches for estimating positions of mobile devices using locations of reference points are illustrated in FIG. 8. Each approach of FIG. 8 may be performed during step 539 of FIG. 5 or during step 639 of FIG. 6. As shown, each approach of FIG. 8 may include the following steps: receive a first location of a first reference point associated with a first identifier identified by the mobile device during step 211 (839*a*); receive a second location of a second reference point associated with a second identifier identified by the mobile device during step 211 (839*b*); and estimate the position of the mobile device using the first location and the second location (839*c*).

In one embodiment of step 839*c*, the estimated position of the mobile device is a definable area between the first reference point and the second reference point, which may be defined as being within the signal ranges of both the first reference point and the second reference point. For example, with reference to FIG. 7, the estimated position of the mobile device 120*a* is Area 1 of the entity 190*a*, within which the mobile device 120*a* can receive signaling from the reference point 110*a* and the reference point 110*b* (but, optionally, not the reference point 110*d*). The estimated position for the mobile device 120*a* is Area 1 of the entity 190*a*, not other areas of the entity 190*a*.

In another embodiment of step 839*c*, the estimated position of the mobile device is a position between the first reference point and the second reference point, which may be estimated using the other information corresponding to steps 215-217, such as RSSI, RTT, or other measurements. For example, with reference to FIG. 7, the estimated position of the mobile device 120*a* is a position at a first estimated distance from the reference point 110*a* based on other information (e.g., measurements from signaling) for the reference point 110*a* corresponding to steps 215-217, and a second estimated distance from the reference point 110*b* based on other information (e.g., measurements from signaling) for the reference point 110*b* corresponding to steps 215-217.

In yet another embodiment of step 839*c*, with reference to FIG. 7, Region 1 of the entity 190*b* corresponds to a region within which the signaling 113*b* is received from the reference point 113*b* by the mobile device 120*b* at a lower level of strength than the signaling 113*c* is received from the reference point 110*c* by the mobile device 120*b*, and Region 2 of the entity 190*b* corresponds to a region within which the signaling 113*c* can be received from the reference point 113*c* by a mobile device (not shown) at a lower strength than the signaling 113*b* can be received from the reference point 113*b* by a mobile device (not shown). The estimated position of the mobile device 120*b* is Region 1 based on other information (e.g., a higher RSSI) for the reference point 110*c* corresponding to steps 215-217, and based on other information (e.g., a lower RSSI) for the reference point 110*b* corresponding to steps 215-217.

Figure 9:
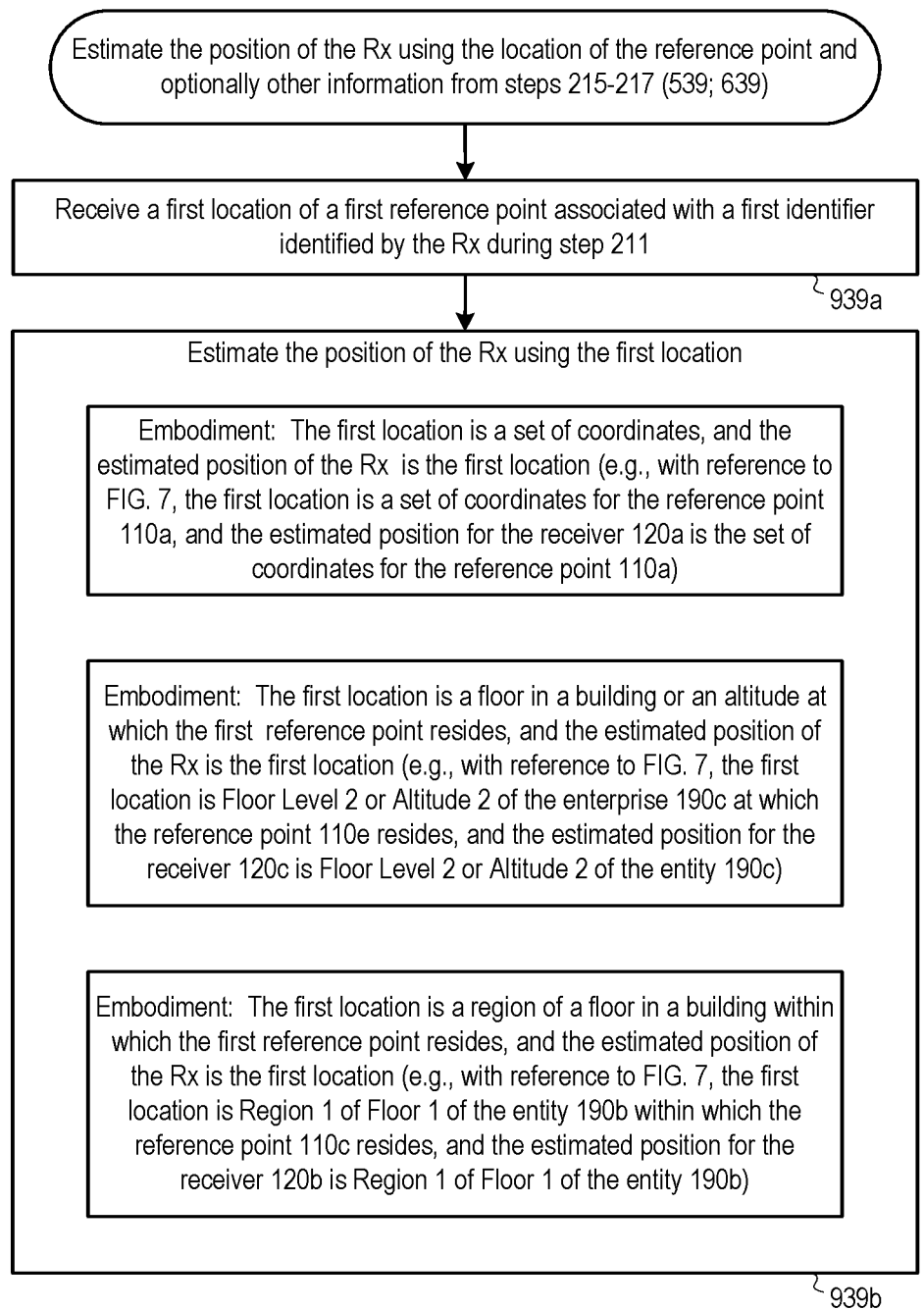
FIG. 9 illustrates approaches for estimating positions of mobile devices using a location of a reference point.

Approaches for estimating positions of mobile devices using one location of one reference point are illustrated in FIG. 9. Each approach of FIG. 9 may be performed during step 539 of FIG. 5 or during step 639 of FIG. 6. As shown, each approach of FIG. 9 may include the following steps: receive a first location of a first reference point associated with a first identifier identified by the mobile device during step 211 (939*a*); and estimate the position of the mobile device using the first location (939*b*).

In one embodiment of step 939*b*, the first location is a set of coordinates, and the estimated position of the mobile device is the first location. For example, with reference to FIG. 7, the first location is a set of coordinates for the reference point 110*a*, and the estimated position for the mobile device 120*a* is the set of coordinates for the reference point 110*a*.

In another embodiment of step 939*b*, the first location is a floor or a region in a building or an altitude at which the first reference point resides, and the estimated position of the mobile device is the first location. For example, with reference to FIG. 7, the first location is the floor level 2 or the altitude 2 of the entity 190*c* at which the reference point 110*e* resides, and the estimated position for the mobile device 120*c* is the floor level 2 or the altitude 2 of the entity 190*c*.

In yet another embodiment of step 939*b*, the first location is a region of a floor in a building within which the first reference point resides, and the estimated position is the first location. For example, with reference to FIG. 7, Region 1 of the entity 190*b* corresponds to a region within which the signaling 113*c* can be received from the reference point 113*c* by the mobile device 120*b*, and Region 2 of the entity 190*b* corresponds to a region within which the signaling 113*b* can be received from the reference point 113*b* by a mobile device (not shown). The estimated position for the mobile device 120*b* is Region 1 of the entity 190*b*.

Signaling

Unless stated otherwise, transmission of data, requests or other information between particular components shown in the figures may be carried out using means that are known in the art. For each of the processes shown in FIG. 5 and FIG. 6, known transmission protocols may be used along with known information elements. The interface between the NEAD and the ELC may use a Na interface, and may be based on the Nq interface between the eSMLC and the NEAD. Aspects disclosed herein result in additions to the Na interface to allow for an indication if the mobile device's identifier is included in the query from the NEAD to the ELS, and an indicator if the returned location from the ELS is an estimate of the location of the mobile device or the location of a reference point identified in the query because the mobile device was not located.

In one embodiment, the signaling in the Nq interface is HTTP for the request, and the response is a HELD message4 described in RFC 5985. The Nq request and response messages are standardized (e.g., in ATIS-070028), and the request may take the following form for specifying an identifier of a Wi-Fi reference point (e.g., A0-12-34-56-78-90) and an identifier of a Bluetooth reference point (e.g., A0:12:34:56:78:91), respectively:

HTTPS://NEAD-LLC-WiFi.example.com/GetAddress/
        A0-12-34-56-78-90
    HTTPS://NEAD-LLC-BT.example.com/GetAddress/A0:
        12:34:56:78:91

The following example illustrates a HELD response with candidate dispatchable location information as described in RFC 5985 [Ref 28] that contains both the civic address of a Wi-Fi Access Point and a geocoded location related to the validated address.

```
<?xml version="1.0"?>
<locationResponse xmlns="urn:ietf:params:xml:ns:geopriv:held">
    <presence xmlns="urn:ietf:params:xml:ns:pidf"
    entity="pres:ae3be8585902e2253ce2@
    NEAD-LLC-WiFi.example.com">
        <tuple id="neadLocation">
            <status>
                <geopriv xmlns="urn:ietf:params:xml:ns:pdif:geopriv10">
                    <location-info>
                        <gs:Point xmlns:gs="http://www.opengis.net/pidflo/1.0"
                        xmlns:gml="http://www.opengis.net/gml"
                        srsName="urn:ogc:def:crs:EPSG::4326">
                        <gml:pos>41.80882 88.11135</gml:pos>
                        </gs:Point>
                        <ca:civicAddress
                        xmlns:ca="urn:ietf:params:xml:ns:pidf:geopriv10:civicAddr"
                        xml:lang="en-au">
                        <ca:country>US</ca:country>
                        <ca:A1>IL</ca:A1>
                        <ca:A2>DuPage</ca:A2>
                        <ca:A3>Lisle</ca:A3>
                        <ca:RD>Warrenville</ca:RD>
                        <ca:STS> Rd</ca:STS>
                        <ca:HNO>3030</ca:HNO>
                        <ca:FLR>Floor 4</ca:FLR>
                        <ca:PC>60532</ca:PC>
                        <ca:LOC>Room 254</ca:LOC>
                        </ca:civicAddress>
                    </location-info>
                    <method>NEAD-WiFi</method>
                </geopriv>
            </status>
            <timestamp>2015-10-19T12:35:02+10:00</timestamp>
        </tuple>
    </presence>
</locationResponse>
```

The following example illustrates the NEAD returning an error indicating that an identifier (e.g., MAC address) is not provisioned in the NEAD.

```
<error xmlns="urn:ietf:params:xml:ns:geopriv:held"
    code=" notLocatable ">
    <message xml:lang="en">MAC address not available</message>
</error>
```

In at least one embodiment, new Nq requests with information elements for the identifier of a Wi-Fi reference point (e.g., A0-12-34-56-78-90) or a Bluetooth reference point (e.g., A0:12:34:56:78:91), and the identifier of the mobile device (e.g., 32-3B-D5-28-F4-CA or B1-2C-FF-35-16-CB) may take the following form for a Wi-Fi reference point and a Bluetooth reference point, respectively:

HTTPS://NEAD-LLC-WiFi.example.com/GetAddress/
        A0-12-34-56-78-90/32-3B-D5-28-F4-CA
    HTTPS://NEAD-LLC-BT.example.com/GetAddress/A0:
        12:34:56:78:91/B1-2C-FF-35-16-CB In at least one embodiment, new Nq requests with information elements for the identifier of a Wi-Fi reference point (e.g., A0-12-34-56-78-90) or a Bluetooth reference point (e.g., A0:12:34:56:78:91), an indicator that the identifier of the mobile device is present (e.g., "1"), and the identifier of the mobile device (e.g., 32-3B-D5-28-F4-CA or B1-2C-FF-35-16-CB), may take the following form for a Wi-Fi reference point and a Bluetooth reference point, respectively:

HTTPS://NEAD-LLC-WiFi.example.com/GetAddress/
        A0-12-34-56-78-90/1/32-3B-D5-28-F4-CA
    HTTPS://NEAD-LLC-BT.example.com/GetAddress/A0:
        12:34:56:78:91/1/B1-2C-FF-35-16-CB In at least one embodiment, new Nq requests with information elements for the identifier of a Wi-Fi reference point (e.g., A0-12-34-56-78-90) or a Bluetooth reference point (e.g., A0:12:34:56:78:91), and an indicator that the identifier of the mobile device is not present (e.g., "0") may take the following form for a Wi-Fi reference point and a Bluetooth reference point, respectively:

HTTPS://NEAD-LLC-WiFi.example.com/GetAddress/
        A0-12-34-56-78-90/0/
    HTTPS://NEAD-LLC-BT.example.com/GetAddress/A0:
        12:34:56:78:91/0/

In at least one embodiment, new Nq requests with information elements for the identifier of a Wi-Fi reference point (e.g., A0-12-34-56-78-90) or a Bluetooth reference point (e.g., A0:12:34:56:78:91), and an indication that the identifier of the mobile device is not present (e.g., 00-00-00-00-00-00 or 00-00-00-00-00-00) may take the following form for a Wi-Fi reference point and a Bluetooth reference point, respectively:

HTTPS://NEAD-LLC-WiFi.example.com/GetAddress/
        A0-12-34-56-78-90/00-00-00-00-00-00
    HTTPS://NEAD-LLC-BT.example.com/GetAddress/A0:
        12:34:56:78:91/00-00-00-00-00-00

In at least one embodiment for the signaling between the NEAD and the ELS, the following example illustrates a HELD response with candidate dispatchable location information that contains both the civic address of a Wi-Fi Access Point and a geocoded location related to the validated address.

```
<?xml version="1.0"?>
<locationResponse xmlns="urn:ietf:params:xml:ns:geopriv:held">
    <presence xmlns="urn:ietf:params:xml:ns:pidf"
    entity="pres:ae3be8585902e2253ce2@
    NEAD-LLC-WiFi.example.com">
        <tuple id="neadLocation">
            <status>
                <geopriv xmlns="urn:ietf:params:xml:ns:pidf:geopriv10">
                    <location-info>
                        <gs:Point xmlns:gs="http://www.opengis.net/pidflo/1.0"
                        xmlns:gml="http://www.opengis.net/gml"
                        srsName="urn:ogc:def:crs:EPSG::4326">
                        <gml:pos>41.80882 88.11135</gml:pos>
                        </gs:Point>
                        <ca:civicAddress
```

-continued

```
    xmlns:ca="urn:ietf:params:xml:ns:pidf:geopriv10:civicAddr"
    xml:lang="en-au">
    <ca:country>US</ca:country>
    <ca:A1>IL</ca:A1>
    <ca:A2>DuPage</ca:A2>
    <ca:A3>Lisle</ca:A3>
    <ca:RD>Warrenville</ca:RD>
    <ca:STS> Rd</ca:STS>
    <ca:HNO>3030</ca:HNO>
    <ca:FLR>Floor 4</ca:FLR>
    <ca:PC>60532</ca:PC>
    <ca:LOC>Room 254</ca:LOC>
    </ca:civicAddress>
  </location-info>
  [see below]
  </geopriv>
 </status>
 <timestamp>2015-10-19T12:35:02+10:00</timestamp>
 </tuple>
</presence>
</locationResponse>
```

Alternative embodiments for the "[see below]" portion of the above HELD response replace the "[see below]" portion with either:
    <method>ELS-WiFiAP</method>(UE not found via ELS, location of the Wi-Fi Access Point) or
    <method>ELS-BTBcn</method>(UE not found via ELS, location of the Bluetooth Beacon)
The following example illustrates the NEAD returning an error indicating that an identifier (e.g., MAC address) is not provisioned in the NEAD.

```
<error xmlns="urn:ietf:params:xml:ns:geopriv:held"
   code=" notLocatable ">
   <message xml:lang="en">MAC address not available</message>
</error>
```

The interface between the NEAD and the ELS can use the same formats at the Nq interface, except the address would be different. In one embodiment, the address is:
    HTTPS://ELS1.example.com Other Aspects Processes described herein generally refer to single items (e.g., one reference point, an identifier of one reference point, one NEAD, one ELS, one ELC, or other). It is contemplated that these processes can be carried out in relation to multiple items (e.g., more than one reference point, more than one identifier of more than one reference point, more than one NEAD, more than one ELS, more than one ELC, or other). To do so, the relevant portions of the processes can be performed in parallel, in series, or by other approaches as would be appreciated by one of ordinary skill in the art. Particular transmitted information may be transmitted separately or together as different parameters.

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a reference point or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things as would be understood in the art. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, reference points described herein may, in some embodiments, include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the reference point (e.g., pressure, temperature, humidity, wind, or other); and/or interface module(s) for exchanging information with other systems via other links other than a radio link. Signals transmitted by a reference point may carry different information that, once determined by a mobile device or a server, may identify the following: the reference point; the reference point's location (LLA); pressure, temperature, humidity, and/or other conditions at or near the reference point.

A mobile device may include any or all of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from reference points, and/or location or other information associated with each reference point), for using the position information to compute an estimated position of the mobile device, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, humidity, wind, other), which may be compared to the same environmental conditions at or near reference points to determine the altitude of the mobile device; other sensor module(s) for measuring other conditions (e.g., acceleration, velocity, orientation, light, sound); interface module(s) for exchanging information with other systems via other links other than a radio link; and/or input/output module(s) for permitting a user to interact with the mobile device. Processing by the mobile device can also occur at a server.

Certain aspects disclosed herein relate to positioning modules that estimate the positions of mobile devices—e.g., where the position is represented in terms of: latitude, longitude, and/or altitude coordinates; x, y, and/or z coordinates; angular coordinates; or other representations. Positioning modules (e.g., processors of the mobile device or location server) use various techniques to estimate the position of a mobile device, including trilateration, which is the process of using geometry to estimate the position of a mobile device using distances traveled by different "positioning" (or "ranging") signals that are received by the mobile device from different reference points. If position information like the transmission time and reception time of a positioning signal from a reference point are known, then the difference between those times multiplied by speed of light would provide an estimate of the distance traveled by that positioning signal from that reference point to the mobile device. Alternatively, if a signal strength of a positioning signal is available, the strength can be used to estimate a distance between the reference point and the mobile device. Different estimated distances corresponding to different positioning signals from different reference points can be used along with position information like the locations of those reference points (e.g., represented in terms of: latitude, longitude, and/or altitude coordinates; x, y, and/or z coordinates; angular coordinates; or other representations) to estimate the position of the mobile device, as is known in the art.

The invention claimed is:

1. A method for transmitting information used to estimate a position of a mobile device, the method comprising:
receiving, at an external location server (ELS), an identifier of a reference point that was identified by a mobile device, wherein the identifier of the reference point is received from a NEAD;
generating, at the ELS, a request for an estimated position of the mobile device;
sending, from the ELS to an enterprise, the request for the estimated position of the mobile device, and the identifier of the reference point;
receiving, at the enterprise, the request for the estimated position of the mobile device, and the identifier of the reference point;
identifying, by the enterprise, a location of the reference point using the identifier of the reference point received from the ELS;
sending, from the enterprise to the ELS, the location of the reference point;
sending, from the enterprise to the ELS, an indication that the location of the reference point is not the estimated position of the mobile device requested by the ELS;
receiving, at the ELS, the location of the reference point;
receiving, at the ELS, the indication that the location of the reference point is not the estimated position of the mobile device requested by the ELS;
sending, from the ELS to the NEAD, the location of the reference point; and
sending, from the ELS to the NEAD, an indication that the location of the reference point is not an estimate of the position of the mobile device.

2. The method of claim 1, the method comprising:
receiving, at the ELS, an identifier of the mobile device, wherein the identifier of the mobile device is received from the NEAD;
sending, from the ELS to the enterprise, the identifier of the mobile device; and
receiving, at the enterprise, the identifier of the mobile device,
wherein the enterprise identifies the location of the reference point using the identifier of the reference point only after the identifier of the mobile device cannot be located by the reference point and other reference points during respective searches for the identifier of the mobile device by the reference point and other reference points.

3. The method of claim 2, wherein the identifier of the reference point is a MAC address and the identifier of the mobile device is a MAC address.

4. The method of claim 1, the method comprising:
receiving, at the ELS, a first indication that an identifier of the mobile device is not available, wherein the first indication is received from the NEAD;
sending, from the ELS to the enterprise, a second indication that the identifier of the mobile device is not available; and
receiving, from the ELS at the enterprise, the second indication,
wherein the enterprise identifies the location of the reference point using the identifier of the reference point only after receiving the second indication.

5. The method of claim 4, wherein the first indication that the identifier of the mobile device is not available comprises one or more bits specifying that the identifier of the mobile device is not available.

6. The method of claim 4, wherein the first indication that the identifier of the mobile device is not available comprises a set of data fields designated for the identifier of the mobile device that are set to a value specifying that the identifier of the mobile device is not available.

7. The method of claim 6, wherein the value of each of the data fields is zero.

8. The method of claim 4, wherein the first indication and the second indication are the same.

9. The method of claim 1, wherein the method comprises:
using the identifier of the reference point to identify a URL stored at the NEAD, wherein the URL identifies the ELS.

10. The method of claim 1, wherein the indication that the location of the reference point is not the estimated position of the mobile device requested by the ELS comprises one or more bits specifying that the location of the reference point is not the estimated position of the mobile device, and wherein the indication that the location of the reference point is not an estimate of the position of the mobile device comprises one or more bits specifying that the location of the reference point is not an estimate of the position of the mobile device.

11. The method of claim 1, wherein the indication that the location of the reference point is not the estimated position of the mobile device requested by the ELS and the indication that the location of the reference point is not an estimate of the position of the mobile device are the same.

12. The method of claim 1, wherein the enterprise is an External Location Controller (ELC).

13. The method of claim 1, wherein the method comprises:
sending, from the NEAD to a location server, the location of the reference point received from the ELS;
receiving, at the location server, the location of the reference point;
determining a position estimate that estimates the position of the mobile device using the location of the reference point; and
sending the position estimate from the location server to a public-safety answering point.

14. A system for transmitting information used to estimate a position of a mobile device, the system comprising:
an external location server (ELS);
an enterprise; and
one or more reference points;
wherein the ELS is operable to:
receive, from a NEAD, an identifier of a reference point that was identified by a mobile device,
generate a request for an estimated position of the mobile device, and
send the request for the estimated position of the mobile device, and
the identifier of the reference point to the enterprise;
wherein the enterprise is operable to:
receive the request for the estimated position of the mobile device, and the identifier of the reference point,
identify a location of the reference point using the identifier of the reference point,
send, to the ELS, the location of the reference point, and
send, to the ELS, an indication that the location of the reference point is not the estimated position of the mobile device requested by the ELS; and wherein the ELS is further operable to:
receive the location of the reference point,
receive the indication that the location of the reference point is not the estimated position of the mobile device requested by the ELS,
send, to the NEAD, the location of the reference point, and
send, to the NEAD, an indication that the location of the reference point is not an estimate of the position of the mobile device.

15. The system of claim 14,
wherein the ELS is operable to:
receive an identifier of the mobile device from the NEAD, and
send the identifier of the mobile device to the enterprise; and
wherein the enterprise is operable to:
receive the identifier of the mobile device, and
identify the location of the reference point using the identifier of the reference point only after the identifier of the mobile device cannot be located by the reference point and other reference points during respective searches for the identifier of the mobile device by the reference point and other reference points.

16. The system of claim 15, wherein the identifier of the reference point is a MAC address and the identifier of the mobile device is a MAC address.

17. The system of claim 14,
wherein the ELS is operable to:
receive, from the NEAD, a first indication that an identifier of the mobile device is not available, and
send, to the enterprise, a second indication that the identifier of the mobile device is not available; and
wherein the enterprise is operable to:
receive the second indication from the ELS,
identify the location of the reference point using the identifier of the reference point only after receiving the second indication.

18. The system of claim 17, wherein the first indication that the identifier of the mobile device is not available comprises one or more bits specifying that the identifier of the mobile device is not available.

19. The system of claim 17, wherein the first indication that the identifier of the mobile device is not available comprises a set of data fields designated for the identifier of the mobile device that are set to a value specifying that the identifier of the mobile device is not available.

20. The system of claim 19, wherein the value of each of the data fields is zero.

21. The system of claim 17, wherein the first indication and the second indication are the same.

22. The system of claim 14, wherein the enterprise is an External Location Controller (ELC).

23. The system of claim 14,
wherein the NEAD is operable to:
use the identifier of the reference point to identify a URL stored at the NEAD, wherein the URL identifies the ELS.

24. The system of claim 14, wherein the indication that the location of the reference point is not the estimated position of the mobile device requested by the ELS comprises one or more bits specifying that the location of the reference point is not the estimated position of the mobile device, and wherein the indication that the location of the reference point is not an estimate of the position of the mobile device comprises one or more bits specifying that the location of the reference point is not an estimate of the position of the mobile device.

25. The system of claim 14, wherein the indication that the location of the reference point is not the estimated position of the mobile device requested by the ELS and the indication that the location of the reference point is not an estimate of the position of the mobile device are the same.

26. The system of claim 14,
wherein the NEAD is operable to:
send, to a location server, the location of the reference point received from the ELS; and
wherein the location server is operable to:
receive the location of the reference point,
determine a position estimate that estimates the position of the mobile device using the location of the reference point, and
send the position estimate to a public-safety answering point.

27. One or more non-transitory machine-readable media embodying program instructions that, when executed by one or more machines, cause the one or more machines to implement a method for transmitting information used to estimate a position of a mobile device, the method comprising:
receiving, at an external location server (ELS), an identifier of a reference point that was identified by a mobile device, wherein the identifier of the reference point is received from a NEAD;
generating, at the ELS, a request for an estimated position of the mobile device;
sending, from the ELS to an enterprise, the request for the estimated position of the mobile device, and the identifier of the reference point;
receiving, at the enterprise, the request for the estimated position of the mobile device, and the identifier of the reference point;
identifying, by the enterprise, a location of the reference point using the identifier of the reference point received from the ELS;
sending, from the enterprise to the ELS, the location of the reference point;
sending, from the enterprise to the ELS, an indication that the location of the reference point is not the estimated position of the mobile device requested by the ELS;
receiving, at the ELS, the location of the reference point;
receiving, at the ELS, the indication that the location of the reference point is not the estimated position of the mobile device requested by the ELS;
sending, from the ELS to the NEAD, the location of the reference point; and
sending, from the ELS to the NEAD, an indication that the location of the reference point is not an estimate of the position of the mobile device.

28. The one or more non-transitory machine-readable media of claim 27, the method comprising:
receiving, at the ELS, an identifier of the mobile device, wherein the identifier of the mobile device is received from the NEAD;
sending, from the ELS to the enterprise, the identifier of the mobile device; and
receiving, at the enterprise, the identifier of the mobile device,
wherein the enterprise identifies the location of the reference point using the identifier of the reference point only after the identifier of the mobile device cannot be located by the reference point and other reference points during respective searches for the identifier of the mobile device by the reference point and other reference points.

29. The one or more non-transitory machine-readable media of claim 28, wherein the identifier of the reference point is a MAC address and the identifier of the mobile device is a MAC address.

30. The one or more non-transitory machine-readable media of claim 27, the method comprising:
receiving, at the ELS, a first indication that an identifier of the mobile device is not available, wherein the first indication is received from the NEAD;
sending, from the ELS to the enterprise, a second indication that the identifier of the mobile device is not available; and
receiving, from the ELS at the enterprise, the second indication,
wherein the enterprise identifies the location of the reference point using the identifier of the reference point only after receiving the second indication.

31. The one or more non-transitory machine-readable media of claim 30, wherein the first indication that the identifier of the mobile device is not available comprises one or more bits specifying that the identifier of the mobile device is not available.

32. The one or more non-transitory machine-readable media of claim 30, wherein the first indication that the identifier of the mobile device is not available comprises a set of data fields designated for the identifier of the mobile device that are set to a value specifying that the identifier of the mobile device is not available.

33. The one or more non-transitory machine-readable media of claim 32, wherein the value of each of the data fields is zero.

34. The one or more non-transitory machine-readable media of claim 30, wherein the first indication and the second indication are the same.

35. The one or more non-transitory machine-readable media of claim 27, wherein the method comprises:
using the identifier of the reference point to identify a URL stored at the NEAD, wherein the URL identifies the ELS.

36. The one or more non-transitory machine-readable media of claim 27, wherein the indication that the location of the reference point is not the estimated position of the mobile device requested by the ELS comprises one or more bits specifying that the location of the reference point is not the estimated position of the mobile device, and wherein the indication that the location of the reference point is not an estimate of the position of the mobile device comprises one or more bits specifying that the location of the reference point is not an estimate of the position of the mobile device.

37. The one or more non-transitory machine-readable media of claim 27, wherein the indication that the location of the reference point is not the estimated position of the mobile device requested by the ELS and the indication that the location of the reference point is not an estimate of the position of the mobile device are the same.

38. The one or more non-transitory machine-readable media of claim 27, wherein the enterprise is an External Location Controller (ELC).

39. The one or more non-transitory machine-readable media of claim 27, wherein the method comprises:
sending, from the NEAD to a location server, the location of the reference point received from the ELS;
receiving, at the location server, the location of the reference point;

determining a position estimate that estimates the position of the mobile device using the location of the reference point; and sending the position estimate from the location server to a public-safety answering point.

* * * * *